(12) United States Patent
Duerbaum

(10) Patent No.: US 6,438,001 B1
(45) Date of Patent: Aug. 20, 2002

(54) CIRCUIT ARRANGEMENT

(75) Inventor: Thomas Duerbaum, Langerwehe (DE)

(73) Assignee: Koninklijke Philips Electronics N.V., New York, NY (US)

( * ) Notice: Subject to any disclaimer, the term of this patent is extended or adjusted under 35 U.S.C. 154(b) by 0 days.

(21) Appl. No.: 10/023,133

(22) Filed: Dec. 17, 2001

(30) Foreign Application Priority Data

Dec. 16, 2000  (DE) .......................... 100 62 980

(51) Int. Cl.[7] .............................................. H02M 1/00
(52) U.S. Cl. ................................ 363/44; 363/126
(58) Field of Search ...................... 363/126, 44, 86

(56) References Cited

U.S. PATENT DOCUMENTS

| | | | |
|---|---|---|---|
| 5,049,788 A | 9/1991 | Lee .............................. | 315/219 |
| 5,103,139 A | 4/1992 | Nilssen ....................... | 315/219 |
| 5,387,847 A | 2/1995 | Wood .......................... | 315/209 |
| 5,714,846 A | 2/1998 | Rasch et al. ................. | 315/225 |
| 5,781,427 A | 7/1998 | Moreau ....................... | 363/61 |
| 6,018,472 A | * 1/2000 | Vogman ...................... | 363/126 |
| 6,141,230 A | * 10/2000 | Sum ............................ | 363/44 |

FOREIGN PATENT DOCUMENTS

| | | |
|---|---|---|
| DE | 4441141 A1 | 5/1996 |
| WO | WO9009087 | 1/1989 |
| WO | WO9637038 | 5/1995 |

\* cited by examiner

*Primary Examiner*—Shawn Riley
(74) *Attorney, Agent, or Firm*—Russell Gross

(57) ABSTRACT

A description is given of a circuit arrangement for converting an input AC voltage into a rectified output voltage with a rectifier circuit (G) and a charging capacitor ($C_{HV}$) downstream in the circuit arrangement. The circuit arrangement additionally includes a stabilizing capacitor ($C_1$, $C_2$) which is connected in parallel to the charging capacitor ($C_{HV}$) so that the stabilizing capacitor ($C_1$, $C_2$) is charged to its maximum when the charging capacitor ($C_{HV}$) is charged, until the value of the voltage present on the stabilizing capacitor ($C_1$, $C_2$) corresponds to a fraction of a maximum peak voltage present on the charging capacitor ($C_{HV}$). This stabilizing capacitor is discharged, in essence, only when the voltage present on the charging capacitor ($C_{HV}$) drops below the value of the voltage present on the stabilizing capacitor ($C_1$, $C_2$).

6 Claims, 1 Drawing Sheet

CIRCUIT ARRANGEMENT

FIELD OF INVENTION

The invention relates to a circuit arrangement for converting an input AC voltage into a rectified output voltage with a rectifier circuit and a charging capacitor downstream in the circuit arrangement.

BACKGROUND OF INVENTION

Such circuit arrangements are used, inter alia, in power supplies for supplying power to any apparatus such as, for example, television sets, monitors, settop boxes or the like. The input voltage is often the mains voltage, for example, a 220V AC voltage. This input AC voltage is converted into a rectified voltage in the rectifier circuit which is usually in the form of suitably arranged diodes, which rectified voltage periodically fluctuates between a peak value and the zero potential. The output voltage of the rectifier circuit therefore shows a high standing wave ratio. To reduce the standing wave ratio, a charging capacitor is connected in parallel to the output of the circuit arrangement, from which charging capacitor the rectified output voltage is tapped. Such a charging capacitor is charged when the rectified voltage on the output of the rectifier circuit rises and is discharged again when the voltage drops. This means that the charging capacitor is used as a buffer which then, when the voltage on the output of the rectifier circuit drops, maintains the voltage for a certain period of time due to the stored amount of charge, until the voltage on the output of the rectifier circuit rises again. The rectified output voltage tapped from this circuit arrangement is consequently smoothed better or less good and usually does not drop below a minimum voltage value. Customarily, such circuit arrangement is used as a so-termed "intermediate circuit". This means that the circuit arrangement is followed by a DC-DC converter which smoothes the rectified output voltage of the intermediate circuit even further and converts the output voltage into the operating voltages necessary for the respective apparatus.

With a voltage supply over the public electricity mains, it must be borne in mind that brief power failures may occur which may extend over several mains half waves. For example, a power failure of 20 ms in a 50 Hz electricity mains stands for 2 half waves being lost. Inevitably, the voltage of the intermediate circuit drops. For such brief power failures not to lead to an interruption of the apparatus, the specifications always require that the apparatus be able to cope with the complete power failure for several mains half waves. However, this requires that the voltage in the intermediate circuit must not drop to zero. The DC-DC converter which follows is furthermore to be able to operate even with the lowest occurring voltage in the intermediate circuit. The design of this converter is then degraded the lower the minimum permitted voltage is in the intermediate circuit if there is a power failure. According to the generally known state of the art the power failure is bridged by a dimensioning the charging capacitor, usually an electrolyte capacitor, correspondingly large. Since this charging capacitor is a component which is stopped by the continuous charging and discharging of heavy loads, more particularly thermal loads, and, in addition, a high dielectric strength (in the European electricity mains normally 400V) is necessary, capacitances of corresponding magnitude are extremely expensive.

SUMMARY OF THE INVENTION

It is an object of the present invention to provide a cost-effective alternative to this known state of the art with which the complete power failure of several mains half waves can most reliably be bridged.

This object is achieved by a circuit arrangement as claimed in claim 1.

The use of a stabilizing capacitor connected in parallel to the charging capacitor, which stabilizing capacitor is used as a spare buffer, the charging capacitor itself may be arranged for normal operation i.e. without taking a power failure into account. Therefore, it may be made considerably smaller and thus more cost effective. Since there is provided according to the invention that the voltage value present on the stabilizing capacitor corresponds only to a fraction of a maximum peak voltage present on the charging capacitor and is therefore discharged again in essence only when a voltage present on the charging capacitor drops below the value of the voltage present on the stabilizing capacitor, the stabilizing capacitor needs to have only a correspondingly lower dielectric strength than a charging capacitor. In addition, this circuit provides that the stabilizing capacitor is used only in rare cases, that is, in the case of a power failure. Therefore, this capacitor is not subjected to a heavy load. These assumptions justify the use of a relatively small and cost-effective stabilizing capacitor.

The fraction of the maximum peak voltage present on the charging capacitor, to which voltage the stabilizing capacitor is charged, is defined by the individual components in the circuit arrangement. The discharging of the stabilizing capacitor then in essence commences approximately when the voltage present on the charging capacitor drops below the value of the voltage present on the stabilizing capacitor. The values do not usually exactly correspond, because minor deviations, which are due to power failures at other components necessary for the circuit arrangement, for example, deviations as a result of threshold voltages of diodes etc., are to be taken into account. Instead of one stabilizing capacitor it is also possible to use a plurality of stabilizing capacitors, for example, two.

In an extremely simple and cost-effective example of embodiment two stabilizing capacitors are used which are connected to each other and to the charging capacitor via diodes, so that during a charging operation the stabilizing capacitors work as stabilizing capacitors connected in parallel to the charging capacitor and in series to each other and during a discharging operation work as stabilizing capacitors connected in parallel to the charging capacitor and in parallel to each other. This means that during the charging operation the voltage present on the charging capacitor is divided over the two stabilizing capacitors connected in series and these stabilizing capacitors are therefore charged only to the respective part of the peak voltage of the charging capacitor. Since in the opposite case i.e. during the discharging operation, the two stabilizing capacitors are each individually connected in parallel to the charging capacitor, these stabilizing capacitors are discharged only when the voltage on the charging capacitor drops below the value of the voltage of the stabilizing capacitors. This is usually only the case when there is a power failure.

Preferably, two stabilizing capacitors are used which have about the same capacitance. The two stabilizing capacitors then only need to have half the dielectric strength of the charging capacitor.

In the circuit arrangement according to the invention an arbitrary rectifier i.e. both a one-way and a two-way rectifier and also an intermediate or a bridge circuit may be used as a rectifier circuit. Preferably a diode bridge circuit is used, because it can be connected directly to the mains input voltage without a transformer and is thus suitable for building switched-mode power supplies.

DETAILED DESCRIPTION

Figure 1:
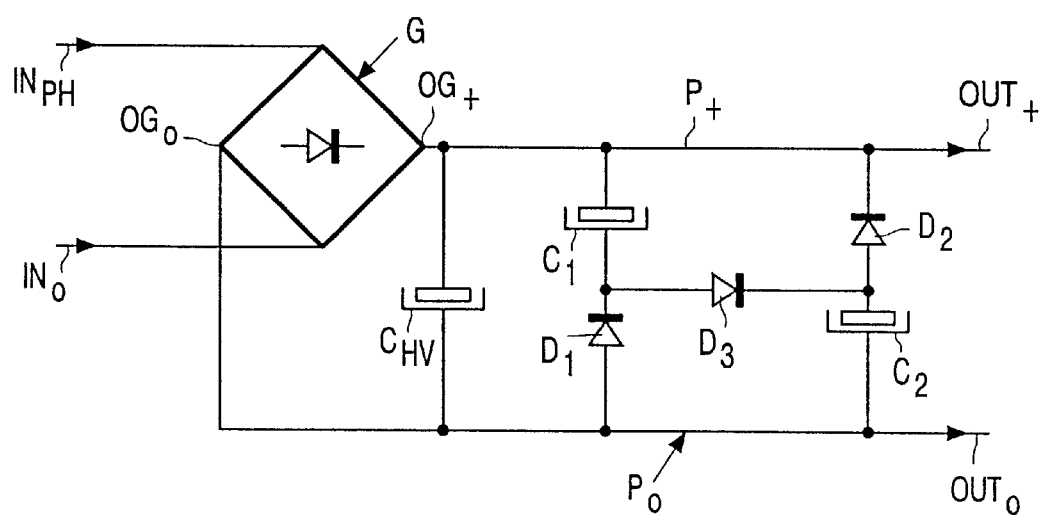
FIG. 1 Illustrates present invention.

The invention will be further explained in the following with reference to an example of embodiment with reference to the appended Figure. The Figure shows a circuit diagram of an example of embodiment of an intermediate circuit structure according to the invention, which, on the one hand, has terminals $IN_{PH}$, $IN_0$ for a 220V electricity mains and, on the other hand, terminals $OUT_+$, $OUT_0$ for connecting a DC-DC converter.

As shown in the Figure the circuit arrangement according to the invention has on the side of the input $IN_{PH}$, $IN_0$ first a rectifier G which is here a customary bridge circuit. In this rectifier G the AC voltage present on the input $IN_{PH}$, $IN_0$ is converted into a rectified voltage which periodically fluctuates between the peak voltage value of the input voltage and the zero potential. A charging capacitor $C_{HV}$ which smoothes the voltage present on the output $OG_+$ of the rectifier G and provides that the voltage value does not drop to zero is connected in parallel to the outputs $OG_0$, $OG_+$ of the rectifier G.

A chain of three reverse-biased diodes $D_1$, $D_2$, $D_3$ serially connected after one another is connected in parallel to the charging capacitor $C_{HV}$ between the lower potential $P_0$ present on the output $OG_0$ of the rectifier G, here a zero potential, and the higher potential $P_+$ present on the other output $OG_+$ of the rectifier G. Between the positive potential $P_+$ and the first diode $D_1$, seen from the zero potential $P_0$, the first stabilizing capacitor $C_1$ is connected. Between the zero potential $P_0$ and the third diode $D_3$, seen from the zero potential $P_0$, the second stabilizing capacitor $C_2$ is connected.

As a result of the special circuit formed by the diodes $D_1$, $D_2$, $D_3$ there is achieved that when the stabilizing capacitors $C_1$, $C_2$ are charged i.e. when there is a flow of current from the positive potential $P_+$ via the first stabilizing capacitor $C_1$, via the middle diode $D_3$ and via the second stabilizing capacitor $C_2$ to the zero potential $P_0$, the two stabilizing capacitors $C_1$, $C_2$ are connected in series. When two stabilizing capacitors $C_1$, $C_2$ having the same capacitance are selected, the two stabilizing capacitors are consequently charged to half the value of the peak voltage present on the charging capacitor $C_{HV}$. Therefore, they also need to have half the dielectric strength. The diode $D_3$ arranged between the stabilizing capacitors $C_1$, $C_2$ provides that via this path the stabilizing capacitors $C_1$, $C_2$ cannot be discharged again.

A discharge of the two stabilizing capacitors $C_1$ and $C_2$ is only possible via the respective diodes $D_1$, $D_2$ i.e. in case of a discharge the two stabilizing capacitors $C_1$, $C_2$ act as two parallel-arranged capacitors. A discharge of the stabilizing capacitors $C_1$, $C_2$ consequently only occurs when the voltage on the charging capacitor $C_{HV}$ i.e. the voltage value of the higher potential $P_+$, drops below the voltage present on the charged stabilizing capacitors $C_1$, $C_2$ (minus the threshold voltage of the diodes $D_1$, $D_2$). As long as the voltage on the charging capacitor $C_{HV}$ does not drop below this value, the stabilizing capacitors $C_1$, $C_2$ as well as the diodes $D_1$, $D_2$, $D_3$ become inactive. Only in the case of a power failure will the voltage on the charging capacitor $C_{HV}$ usually drop below this value. From this instant on the intermediate circuit voltage then drops considerably more slowly because then the energy is supplied from the two stabilizing capacitors $C_1$ and $C_2$.

The charging capacitor $C_{HV}$ therefore only needs to be arranged for normal operation. This means that a charging capacitor $C_{HV}$ is selected that adheres to the normal instructions relating to the useful life, the RMS value, the desired current and the voltage ripple (ripple voltage) as well as the necessary dielectric strength. In the case of a use in the European 220 V electricity mains, for example, a 440 V electrolyte capacitor is suitable for this purpose.

The two stabilizing capacitors $C_1$, $C_2$, on the other hand, need to have only half the dielectric strength. The other values of the capacitors can be optimized in accordance with the requirements of the next DC-DC converter, of the input mains voltage and the other specifications. Since both the stabilizing capacitors $C_1$ and $C_2$ and also the diodes $D_1$, $D_2$, $D_3$ are rarely used, the load of these components is extremely small, so that extremely cost-effective components can be used. Simple diodes, for example, normal 50 Hz silicon diodes having a threshold voltage of 0.7 V can be used then.

In a present example of embodiment a capacitor having 68 $\mu$F is used as a charging capacitor and capacitors having 100 $\mu$F are used as stabilizing capacitors. Obviously, also capacitors having any other matching values can be used.

In addition, it is also evident that the capacitors and diodes described or also shown in the Figure, respectively, represent only functional capacitances and diodes. This means that each one of the capacitors can also be substituted for a plurality of parallel capacitors. It is also possible to use a plurality of parallel-arranged diodes and/or diodes connected in chains instead of a single diode, so as to obtain greater security, for example, by the redundant arrangement of diodes.

With the circuit arrangement according to the invention the relatively large and extremely expensive charging capacitor in the so far customary circuit arrangements can be considerably reduced and optimized for normal operation without taking power failures into account. Since the additional capacitors such as diodes are used only in case of a power failure, extremely cheap components can be used for this purpose. This provides that in a simple manner a sufficiently large but nevertheless cost-effective capacitance can be provided for the power failure.

What is claimed is:

1. A circuit arrangement for converting an input AC voltage into a rectified output voltage with a rectifier circuit (G) and a charging capacitor ($C_{HV}$) downstream in the circuit arrangement, characterized by a stabilizing capacitor ($C_1$, $C_2$) which is connected in parallel to the charging capacitor ($C_{HV}$) so that the stabilizing capacitor ($C_1$, $C_2$) is charged to its maximum when the charging capacitor ($C_{HV}$) is charged, until the value of the voltage present on the stabilizing capacitor ($C_1$, $C_2$) corresponds to a fraction of a maximum peak voltage present on the charging capacitor ($C_{HV}$) and the stabilizing capacitor ($C_1$, $C_2$) is discharged again when the charging capacitor ($C_{HV}$) is discharged, in essence only when the voltage present on the charging capacitor ($C_{HV}$) drops below the value of the voltage present on the stabilizing capacitor ($C_1$, $C_2$).

2. A circuit arrangement as claimed in claim 1, characterized in that two stabilizing capacitors which are connected by diodes ($D_1$, $D_2$, $D_3$) to each other and to the charging capacitor ($C_{HV}$) so that the stabilizing capacitors ($C_1$, $C_2$) during a charging operation work in parallel to the charging capacitor ($C_{HV}$) as stabilizing capacitors ($C_1$, $C_2$)

connected in series to each other and during a discharging operation work as stabilizing capacitors ($C_1$, $C_2$) in parallel to the charging capacitor ($C_{HV}$) in parallel to each other.

3. A circuit arrangement as claimed in claim 2, characterized by three reverse biased diodes ($D_1$, $D_2$, $D_3$) connected in series after one another and in parallel to the charging capacitor ($C_{HV}$) between a lower potential ($P_0$) and a higher potential ($P_+$), a first stabilizing capacitor ($C_1$) connected between the higher potential ($P_+$) and the first one of the three diodes ($D_1$) seen from the lower potential ($P_0$), and a second stabilizing capacitor ($C_2$) connected between the lower potential ($P_0$) and the third one of the three diodes ($D_3$) seen from the lower potential ($P_0$).

4. A circuit arrangement as claimed in claim 2, characterized in that the stabilizing capacitors ($C_1$, $C_2$) have capacitances that have a defined ratio to each other.

5. A circuit arrangement as claimed in claim 2, characterized in that the stabilizing capacitors ($C_1$, $C_2$) in essence have the same capacitance.

6. A circuit arrangement as claimed in claim 1, characterized in that the rectifier circuit (G) comprises a bridge circuit.

\* \* \* \* \*